(12) United States Patent
Chung et al.

(10) Patent No.: US 8,665,538 B2
(45) Date of Patent: Mar. 4, 2014

(54) IMAGING LENS APPARATUS

(75) Inventors: Feng-Chao Chung, Changhua Hsien (TW); Hung-Wen Lee, Changhua Hsien (TW)

(73) Assignee: Glory Science Co., Ltd., Changhua Hsien (TW)

( * ) Notice: Subject to any disclaimer, the term of this patent is extended or adjusted under 35 U.S.C. 154(b) by 91 days.

(21) Appl. No.: 13/524,011

(22) Filed: Jun. 15, 2012

(65) Prior Publication Data

US 2013/0335836 A1    Dec. 19, 2013

(51) Int. Cl.
*G02B 9/34* (2006.01)
*G02B 3/02* (2006.01)

(52) U.S. Cl.
CPC ........................................ *G02B 9/34* (2013.01)
USPC ........................................... 359/773; 359/715

(58) Field of Classification Search
USPC .................................. 359/715, 771, 772, 773
See application file for complete search history.

(56) References Cited

U.S. PATENT DOCUMENTS 8,508,863 B2 *  8/2013  Tang et al. ..................... 359/715

* cited by examiner

*Primary Examiner* — Jack Dinh

(57) ABSTRACT

An imaging lens apparatus comprises four lenses with refractive power by which lead the light from the object side to the image side: a first lens with a convex object-side surface and positive refractive power, at least one surface of the first lens is aspheric; an aperture stop set next to the first lens; a second lens which is a biconcave lens with negative refractive power, at least one surface of the second lens is aspheric; a third lens which is a positive meniscus lens with a concave object-side surface, both side of the third lens are aspheric; and a fourth lens which is a negative meniscus lens with a convex object-side surface, both side of the fourth lens are aspheric with at least one inflection point; and the imaging lens apparatus satisfy the conditions below: $|1/slope\_S8|>0.9$; $-0.2<SAG\_S8<0.1$.

7 Claims, 11 Drawing Sheets

IMAGING LENS APPARATUS

BACKGROUND OF THE INVENTION

1. Field of the Invention

The present invention generally relates to a photographing lens apparatus, and more particularly to a photographing lens apparatus having four optical lenses and suitable for small photographing device.

2. The Related Art

With the growth of the consumer electronic markets, the request for photographing module is also increasing. Particularly to the camera equipped in photograph phone, tablet computer and laptop, optical lens almost become the mainstream accessories. However, in order to be installed in the mounting body which itself becomes more and more slim, small and light, the photographing module must be compact accordingly. Besides, image quality and pixels of the optical lens are also important considerations for customers to choose.

In order to improve the image quality, more and more electronic products use multi-lenses in their photographing module. However, the incident light would reflect on the surface of the lens. When a strong beam enters the photographing module, the reflected light arise from multiple reflecting surfaces each other could cause the flare and ghost at the imaging area. Although the reflect impact of the lenses could be reduced by coating the lenses, said flare and ghost still cannot be completely eliminated when the incident light is too strong or the incident angle of said incident light is too large. For those multiple-lenses photographing module in small size, the incident light would easily be reflected at the periphery of the lens located nearest to the image plane and cause multiple reflection, due to the angle of incident of the incident light in these area is usually larger than other places.

In view of these disadvantages above, the photographing module and the imaging lens apparatus should be improved.

SUMMARY OF THE INVENTION

An objective of the present invention is to provide imaging lens apparatus with four lenses which can eliminate or reduce the ghost and the flare caused by multiple reflection of multiple lens surfaces at the imaging area by designing the aspheric surface of lenses to reduce the reflected light between surfaces.

To achieve such purpose, the imaging lens apparatus in this invention comprises four lenses with refractive power by which lead the light from the object side to the image side:

a first lens with a convex object-side surface and positive refractive power, at least one surface of the first lens is aspheric;

a second lens which is a biconcave lens with negative refractive power, at least one surface of the second lens is aspheric;

an aperture stop which control the ray cone that come to focus at the image plane, located between the first lens and the second lens;

a third lens which is a positive meniscus lens with a concave object-side surface, both side of the third lens are aspheric; and a fourth lens which is a negative meniscus lens with a convex object-side surface, both sides of the fourth lens are aspheric with at least one inflection point.

Furthermore, to reduce the ghost and flare caused by the reflected light of the fourth lens, the imaging lens apparatus further satisfies the conditions below:

$|1/slope\_S8|>0.9$ $-0.2<SAG\_S8/SD\_S8<0.1$

Wherein, slope_S8 is the slope of the periphery about 80%~100% of the effective diameter of the image-side surface of the fourth lens in the imaging lens apparatus. SD_S8 is the vertical distance between the periphery about 80%~100% of the effective diameter of the image-side surface of the fourth lens and the optical axis, and SAG_S8 is the sag of the image-side surface of the fourth lens related to SD_S8.

In this embodiment, the imaging lens apparatus further satisfies the conditions below to balance the focal length of each lens and improve the performance.

$1.5<f/BFL<5$ $-2.5<f_2/f<-0.7$ $R_3/f<0$ wherein, f is the combined focal length of the first to fourth lens, BFL is the distance between the imaging plane and the image-side surface of the nearest lens to the imaging plane, $f_2$ is the focal length of the second lens, and $R_3$ is radius of curvature of the object-side surface of the second lens.

In a better embodiment, the imaging lens apparatus further satisfies equations below:

$V_2<32$ $-0.8<SAG\_S6/SD\_S6<-0.2$ $|1/slope\_S6|>0.5$

Wherein, $V_2$ is the abbe number (a measure of the material's dispersion in relation to the refractive index) of the second lens, Slope_S6 is the slope of the periphery about 80%~100% of the effective diameter of the image-side surface of the third lens in the imaging lens apparatus. SD_S6 is the vertical distance between the periphery about 80%~100% of the effective diameter of the image-side surface of the third lens and the optical axis, and SAG_S6 is the sag of the image-side surface of the third lens related to SD_S6.

As described above, the imaging lens apparatus in this invention can limit the angle of incidence ray and the irradiance of the reflected light, and reduce the ghost and the flare formed at the imaging area by adjusting the slope and the sag of the periphery of the image-side surface of the fourth lens. It is also preferable to keep the distortion aberration under 2%, angle of view more than 70 degree, to correct the spherical aberration, chromatic aberration, astigmatic difference and the ghost. Accordingly it improves the image quality and reduces the produce cost.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
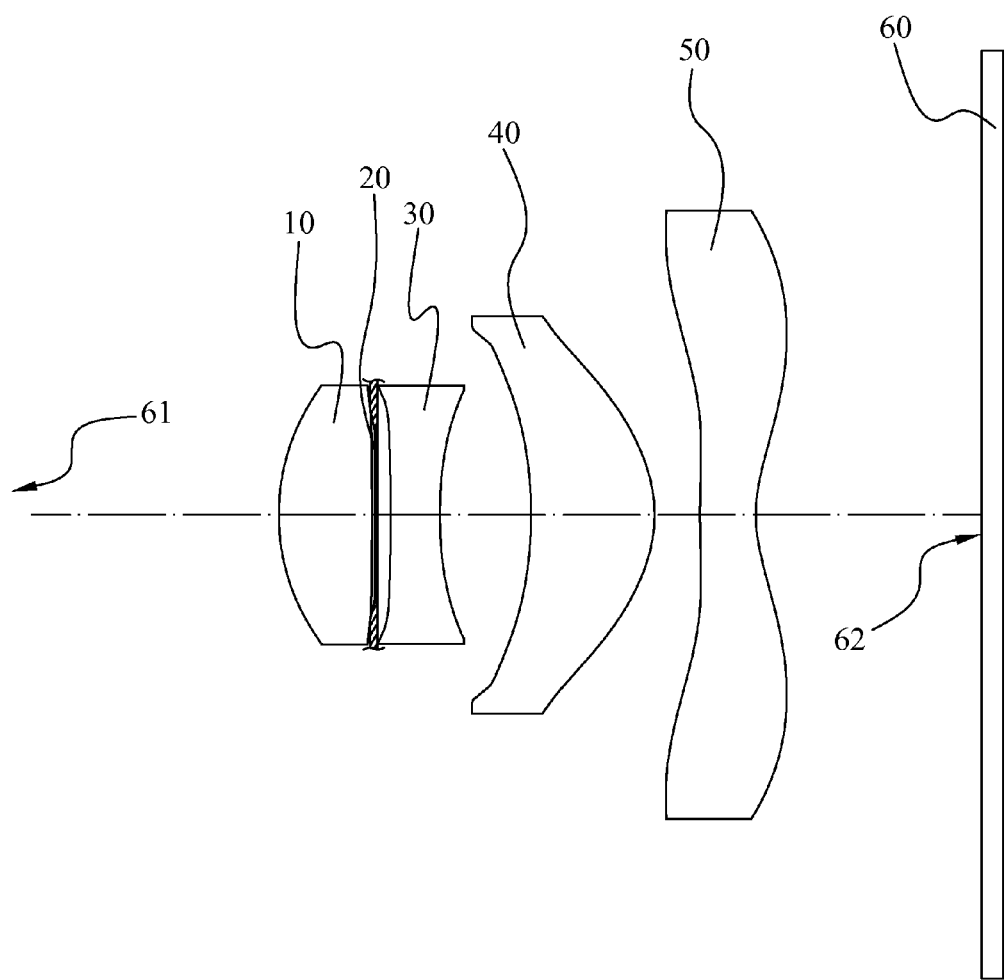
FIG. 1 shows a cross section of lenses in the imaging lens apparatus of the present invention.

With reference to FIG. 1, an imaging lens apparatus in accordance with the present invention is shown. The imaging lens apparatus comprises four lenses with refractive power by which leads the light from the object-side 61 to the image-side 62:

a first lens 10 with positive refractive power and convex object-side surface, at least one surface of the first lens 10 is aspheric;

a second lens 30 with negative refractive power, both surfaces of the second lens 30 are concave, and at least one surface of the second lens 30 is aspheric;

an aperture stop 20 for controlling the ray cone that come to focus at the image plane, which located between the first lens and the second lens;

a third lens 40 is a positive meniscus lens with a concave object-side surface, both side of the third lens are aspheric; and a fourth lens 50 is a negative meniscus lens with a convex object-side surface, and both sides of the fourth lens are aspheric with at least one inflection point.

In order to reduce the ghost and flare due to the multiple reflection of the fourth lens surfaces, the imaging lens apparatus further satisfies conditions below:

$|1/\text{slope\_S8}| > 0.9$ $-0.2 < SAG\_S8/SD\_S8 < 0.1$

Wherein, slope_S8 is the slope of the periphery (about 80%~100% of effective diameter area) of the image-side surface of the fourth lens 50, SD_S8 is the vertical distance between the periphery (about 80%~100% of effective diameter area) of the image-side surface of the fourth lens 50 and the optical axis, and SAG_S8 is the sag (the optical-axis-direction of the displacement of the surface from the vertex, at the vertical distance from the optical axis) of the image-side surface of the fourth lens 50 related to SD_S8.

By adjusting slope_S8, SD_S8 and SAG_S8, the imaging lens apparatus in this invention can reduce the angle of incidence ray and irradiance of reflected light, eliminating the ghost and flare formed at imaging area.

In a feasible embodiment, the imaging lens apparatus further satisfies the follow conditions to balance the focal length between each of the lenses and improve the performance of the imaging lens apparatus:

$1.5 < f/BFL < 5$ $-2.5 < f_2/f < -0.7$ $R_3/f < 0$

Wherein, f is the combined focal of the first to fourth lenses, BFL is the distance between the imaging plane 60 and the image-side surface of the nearest lens to the imaging plane 60 (the fourth lens 50), $f_2$ is the focal length of the second lens 30, and $R_3$ is the radius of curvature of the object-side surface of the second lens 30.

In a better embodiment, the imaging lens apparatus in this invention further satisfies following conditions:

$V_2 < 32$ $-0.8 < SAG\_S6/SD\_S6 < -0.2$ $|1/\text{slope\_S6}| > 0.5$

Wherein, SD_S6 is the vertical distance between the periphery (about 80%~100% of effective diameter) of the image-side surface of the third lens 40 and the optical axis; SAG_S6 is sag of the periphery (about 80%~100% of effective diameter) of the image-side surface of the third lens 40 related to SD_S6; and slope_S6 is the slope of the periphery (about 80%~100% of effective diameter area) of the image-side surface of the third lens 40.

Figure 2A:
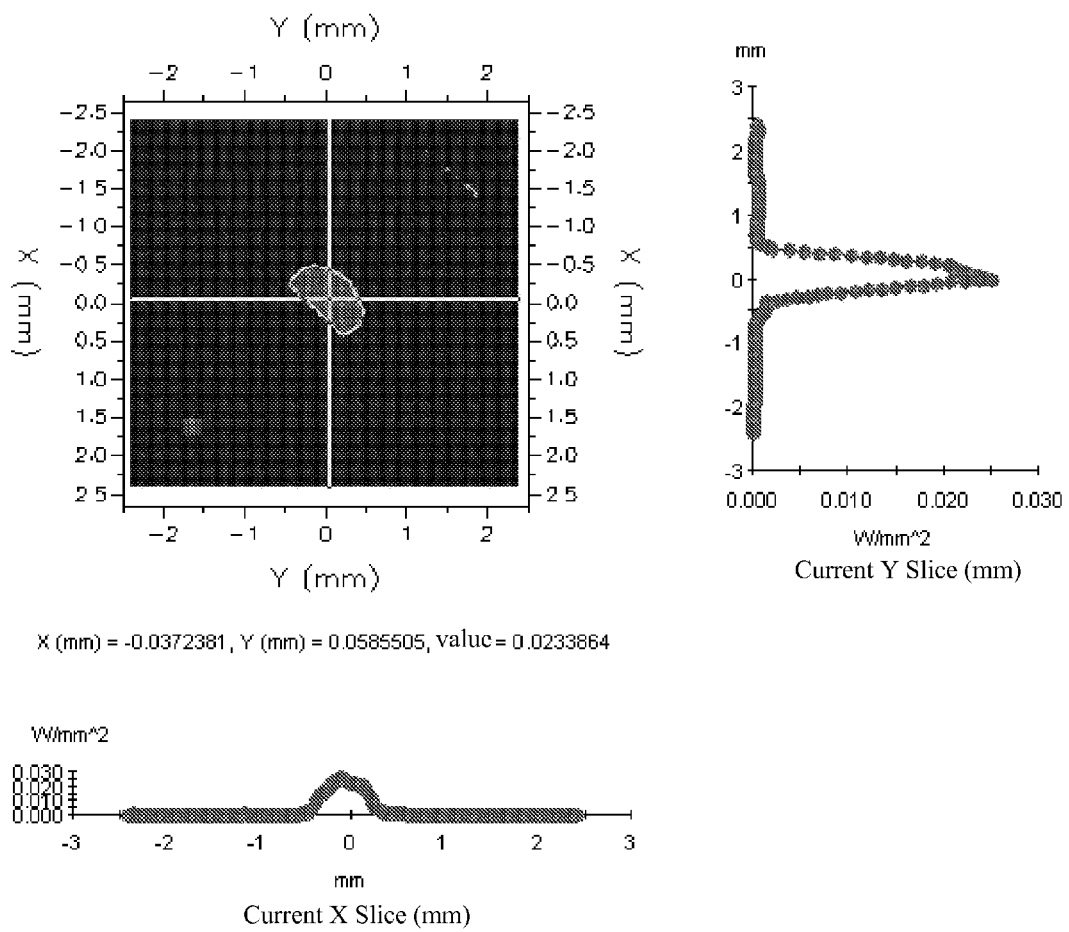
FIG. 2A shows irradiance of the reflected light in the related art.
Figure 2B:
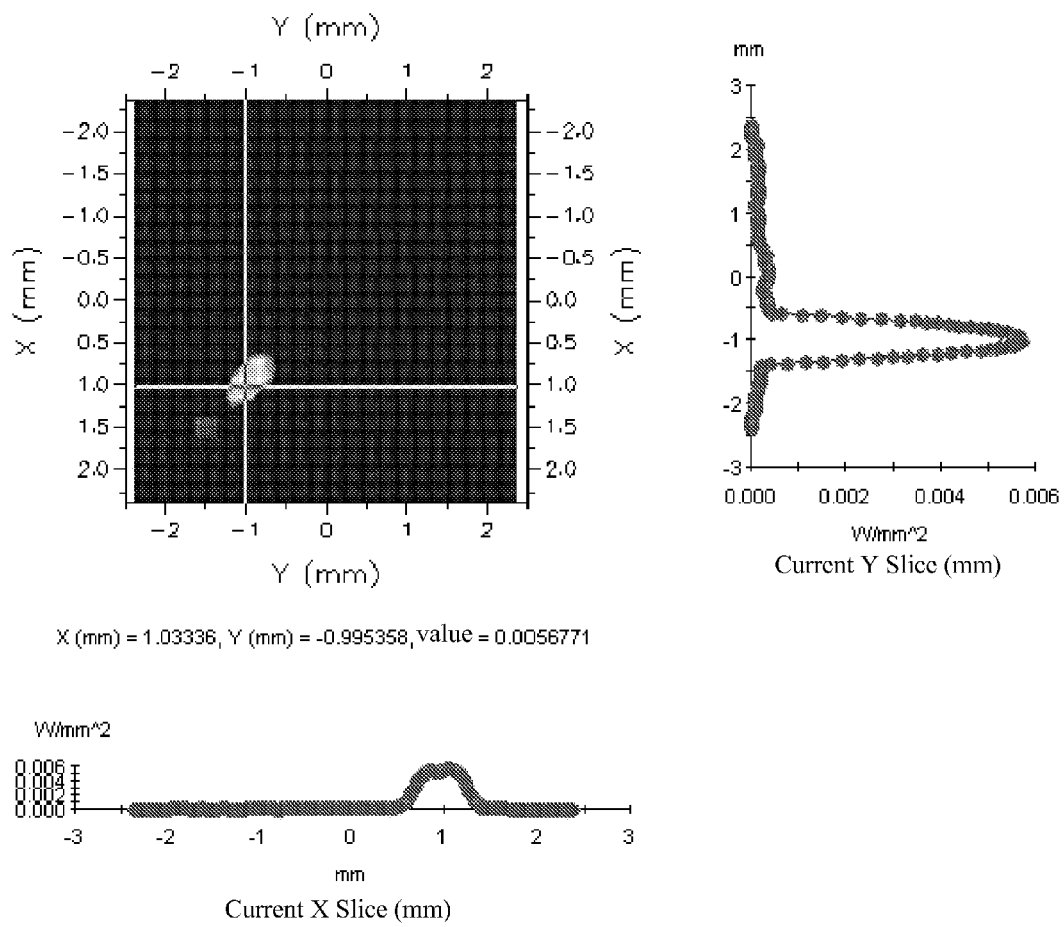
FIG. 2B shows irradiance of the reflected light in the present invention.

Referring to FIG. 2A, FIG. 2A shows a strong secondary reflection at the fourth lens surfaces in a common four-lenses photographing system; the peak of irradiance appears at the origin of the coordinate system and the peak value of irradiance is 0.233 w/mm². Referring to FIG. 2B, FIG. 2B shows that the peak of irradiance move to the edge of the coordinate system and the peak value of irradiance greatly reduce to 0.0056 w/mm².

Figure 3:
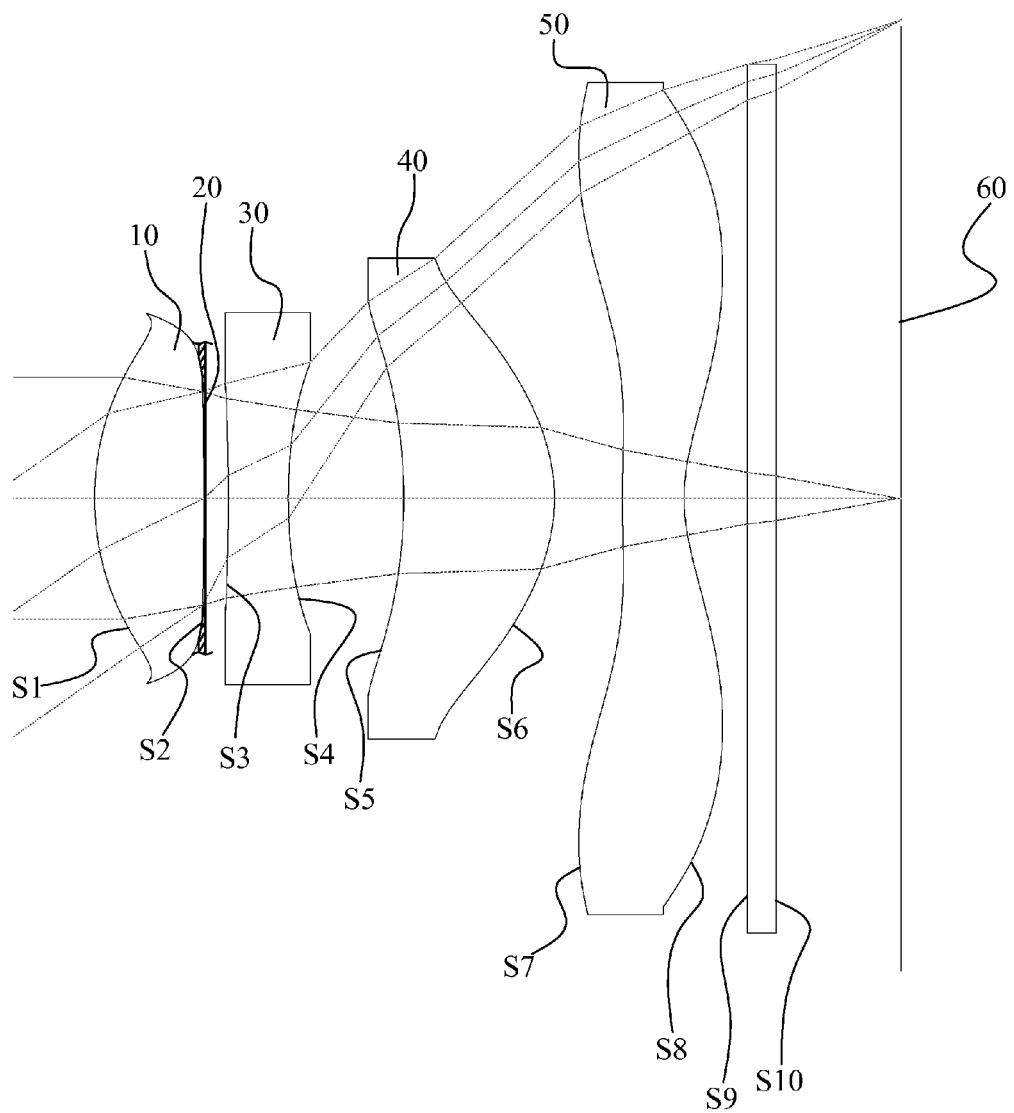
FIG. 3 shows a cross section of lenses in the imaging lens apparatus of the first embodiment of the present invention.

Referring to FIG. 3, FIG. 3 shows the first embodiment. In this embodiment, the F number is 2.8, angle of view is more than 69.8 degree, f/BFL is 2.93, $f_2/f$ is −1.8, $R_3/f$ is −3.25, and the radius of curvature, value of air space, refractivity and abbe number are listed below:

| surface # | Radius of curvature | Air space | Refractivity | Abbe number |
|---|---|---|---|---|
| S1 | 1.333 | 0.548 | 1.5311 | 55.7 |
| stop | −13.002 | 0.122 | | |
| S3 | −7.860 | 0.300 | 1.5850 | 30.0 |
| S4 | 2.870 | 0.578 | | |
| S5 | −2.674 | 0.756 | 1.5311 | 55.7 |
| S6 | −0.889 | 0.340 | | |
| S7 | 4.937 | 0.309 | 1.5311 | 55.7 |
| S8 | 0.902 | 0.317 | | |
| S9 | Inf | 0.145 | 1.5170 | 64.1 |
| S10 | Inf | 0.626 | | |

Furthermore, the aspheric surfaces of the first lens 10 to the fourth lens 50 satisfy the following aspheric equation:

$$z = \frac{ch^2}{1 + \sqrt{(1-(1+k)c^2h^2)}} + A_4h^4 + A_6h^6 + A_8h^8 + A_{10}h^{10} + A_{12}h^{12} + A_{14}h^{14} + A_{16}h^{16}$$

Wherein, c is the curvature of the lens surface, h is the vertical distance between the surface of lens and the optical axis, k is the conic constant, and $A_4, A_6, A_8, A_{10}, A_{12}, A_{14}$ and $A_{16}$ are the aspheric constants of the higher order items. Said conic constant and aspheric constants are listed below:

|       | S1          | S2        | S3          | S4        | S5        | S6       | S7        | S8        |
|-------|-------------|-----------|-------------|-----------|-----------|----------|-----------|-----------|
| K     | 0.263172896 | 44.183848 | 8.37983061  | 6.500392  | 4.415418  | −0.6269  | −548.876  | −6.78898  |
| $A_4$ | −0.01826639 | 0.1328105 | 0.225072968 | 0.204311  | 0.026654  | 0.211797 | −0.25521  | −0.16788  |
| $A_6$ | 0.150211125 | −0.255441 | −0.59195815 | −0.31559  | −0.11672  | −0.13091 | 0.178244  | 0.101497  |
| $A_8$ | −0.52964429 | −0.073539 | −0.08624223 | 0.030196  | 0.251058  | 0.023192 | −0.05599  | −0.04387  |
| $A_{10}$ | 0.74411106 | 0.23053  | 1.019177128 | 0.480382  | −0.14097  | 0.081456 | 0.008815  | 0.011782  |
| $A_{12}$ | −0.00047794 | −0.943381 | −1.70669472 | −0.41675 | 0.050258  | −0.01776 | −0.00056  | −0.00178  |
| $A_{14}$ | −0.97917112 | 0.3153944 | 0.343494783 | 0.089191 | 0         | −0.00467 | 0         | 0.000115  |
| $A_{16}$ | 0.183496007 | −2.31E−05 | −1.99E−05   | 0         | 0         | 0        | 0         | 0         |

With the settings in the first embodiment, the ratio of the sag and the vertical distance between surface and the optical axis at the periphery of the image-side surface of the third lens 40 (SAG_S6/SD_S6) falls in the range from −0.5 to −0.3, the absolute value of reciprocal of the slope at the periphery of the image-side surface of the third lens 40 (|1/slope_S6|) falls in the range from 1.25 to 3.39; the ratio of the sag and the vertical distance between surface and optical axis at the periphery of the image-side surface of the fourth lens 50 (SAG_S8/SD_S8) falls in the range from −0.05 to 0.04, the absolute value of reciprocal of the slope at the periphery of the image-side surface of the fourth lens 50 (|1/slope_S8|) falls in the range from 1.4 to 2.9.

Figure 4:
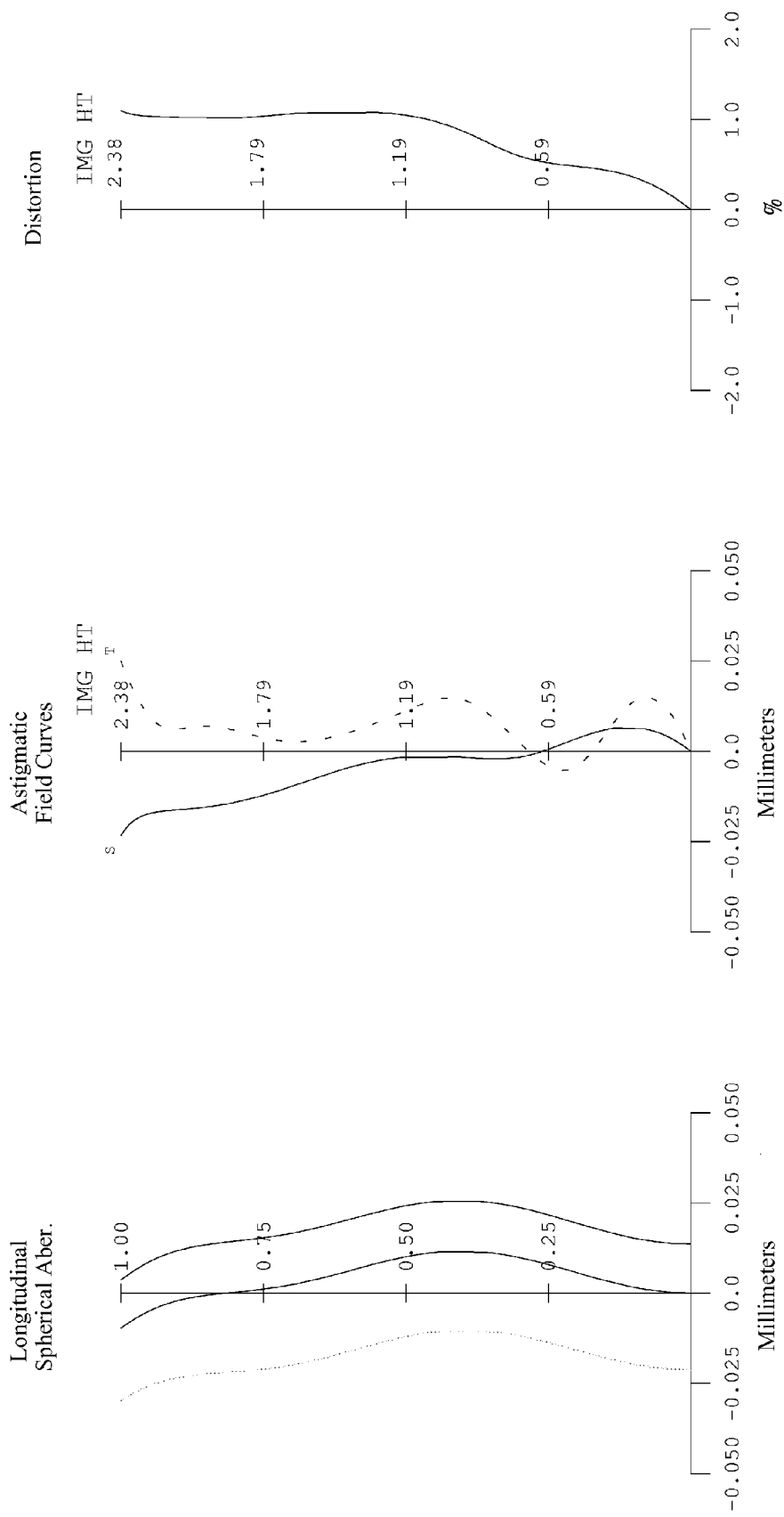
FIG. 4 shows various aberrations of the imaging lens apparatus of FIG. 3.

Referring to FIG. 4, as shown in FIG. 4, the spherical aberration, the astigmatic difference and the distortion aberration are all controlled in an excellent range. It is easy to see that the imaging lens apparatus in the present invention can not only eliminate the ghost and the flare, but also keep a good image quality.

Figure 5:
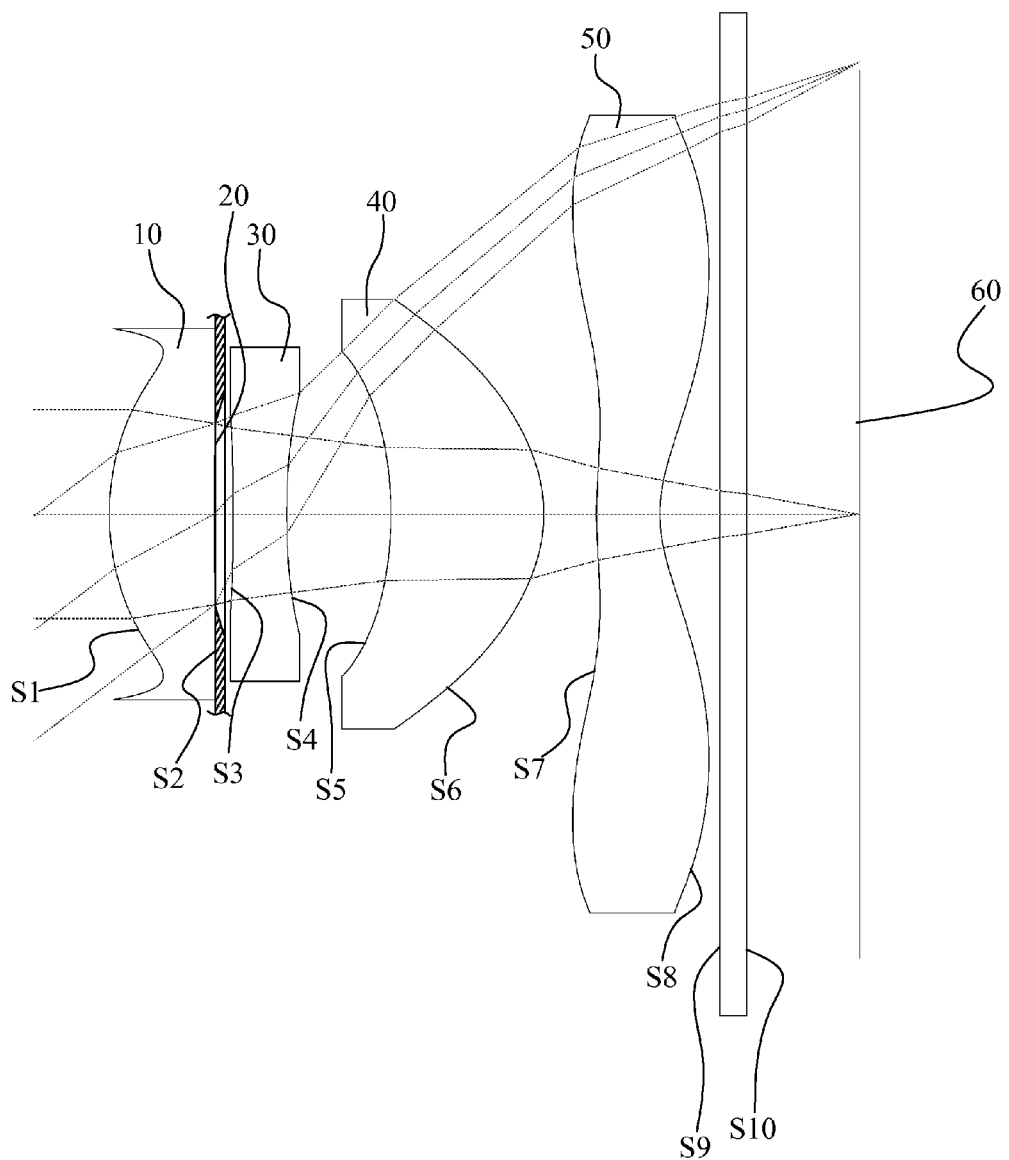
FIG. 5 shows a cross section of lenses in the imaging lens apparatus of the second embodiment of the present invention.

Referring to FIG. 5, FIG. 5 shows the second embodiment. In this embodiment, the F number is 2.8, angle of view is more than 74.6 degree, f/BFL is 2.88, $f_2/f$ is −1.64, $R_3/f$ is −3.15, and the radius of curvature, value of air space, refractivity and abbe number are listed below:

| surface # | Radius of curvature | Air space | Refractivity | Abbe number |
|-----------|---------------------|-----------|--------------|-------------|
| S1        | 1.302               | 0.556     | 1.5311       | 55.7        |
| stop      | 22.824              | 0.101     |              |             |
| S3        | −9.670              | 0.285     | 1.5850       | 30.0        |
| S4        | 4.340               | 0.551     |              |             |
| S5        | −2.081              | 0.811     | 1.5441       | 56.0        |
| S6        | −0.803              | 0.281     |              |             |
| S7        | 2.646               | 0.335     | 1.5311       | 55.7        |
| S8        | 0.737               | 0.317     |              |             |
| S9        | Inf                 | 0.145     | 1.517        | 64.1        |
| S10       | Inf                 | 0.604     |              |             |

Furthermore, the aspheric surfaces of the first lens 10 to the fourth lens 50 satisfy the following aspheric equation:

$$z = \frac{ch^2}{1 + \sqrt{(1 - (1+k)c^2 h^2)}} + A_4 h^4 + A_6 h^6 + A_8 h^8 + A_{10} h^{10} + A_{12} h^{12} + A_{14} h^{14} + A_{16} h^{16}$$

Wherein, c is the curvature of the lens surface, h is the vertical distance between the surface of lens and the optical axis, k is the conic constant, and $A_4, A_6, A_8, A_{10}, A_{12}, A_{14}$ and $A_{16}$ are the aspheric constants of the higher order items. Said conic constant and aspheric constants are listed below:

|          | S1        | S2        | S3        | S4        | S5        | S6       | S7        | S8        |
|----------|-----------|-----------|-----------|-----------|-----------|----------|-----------|-----------|
| K        | 0.312856  | 0         | 0         | 8.734343  | 4.263026  | −0.63956 | −111.364  | −5.41417  |
| $A_4$    | −0.01255  | 0.091359  | 0.156419  | 0.201831  | −0.00923  | 0.209073 | −0.24895  | −0.16636  |
| $A_6$    | 0.150432  | −0.28843  | −0.61987  | −0.26991  | −0.13427  | −0.14212 | 0.177236  | 0.102327  |
| $A_8$    | −0.51675  | −0.13136  | −0.09684  | 0.002474  | 0.276807  | 0.00967  | −0.05623  | −0.04376  |
| $A_{10}$ | 0.763076  | −0.28341  | 0.227149  | 0.32021   | −0.12175  | 0.075742 | 0.008802  | 0.01178   |
| $A_{12}$ | 0.013784  | −1.11321  | −1.81958  | −0.51692  | 0.050456  | −0.01794 | −0.00054  | −0.00178  |
| $A_{14}$ | −1.04135  | −1.16573  | −1.67461  | 0.517275  | 0         | −0.00098 | 0         | 0.000115  |
| $A_{16}$ | −0.02625  | −1.55E−05 | −1.24E−05 | 0         | 0         | 0        | 0         | 0         |

With the settings in the second embodiment, the ratio of the sag and the vertical distance between surface and optical axis at the periphery of the image-side surface of the third lens 40 (SAG_S6/SD_S6) falls in the range from −0.7 to −0.3, the absolute value of reciprocal of the slope at the periphery of the image-side surface of the third lens 40 (|1/slope_S6|) falls in the range from 0.7 to 0.87; the ratio of the sag and the vertical distance between surface and optical axis at the periphery of the image-side surface of the fourth lens 50 (SAG_S8/SD_S8) falls in the range from 0.038 to 0.085, the absolute value of reciprocal of the slope at the periphery of the image-side surface of the fourth lens 50 (|1/slope_S8|) falls in the range from 3.0 to 4.7.

Figure 6:
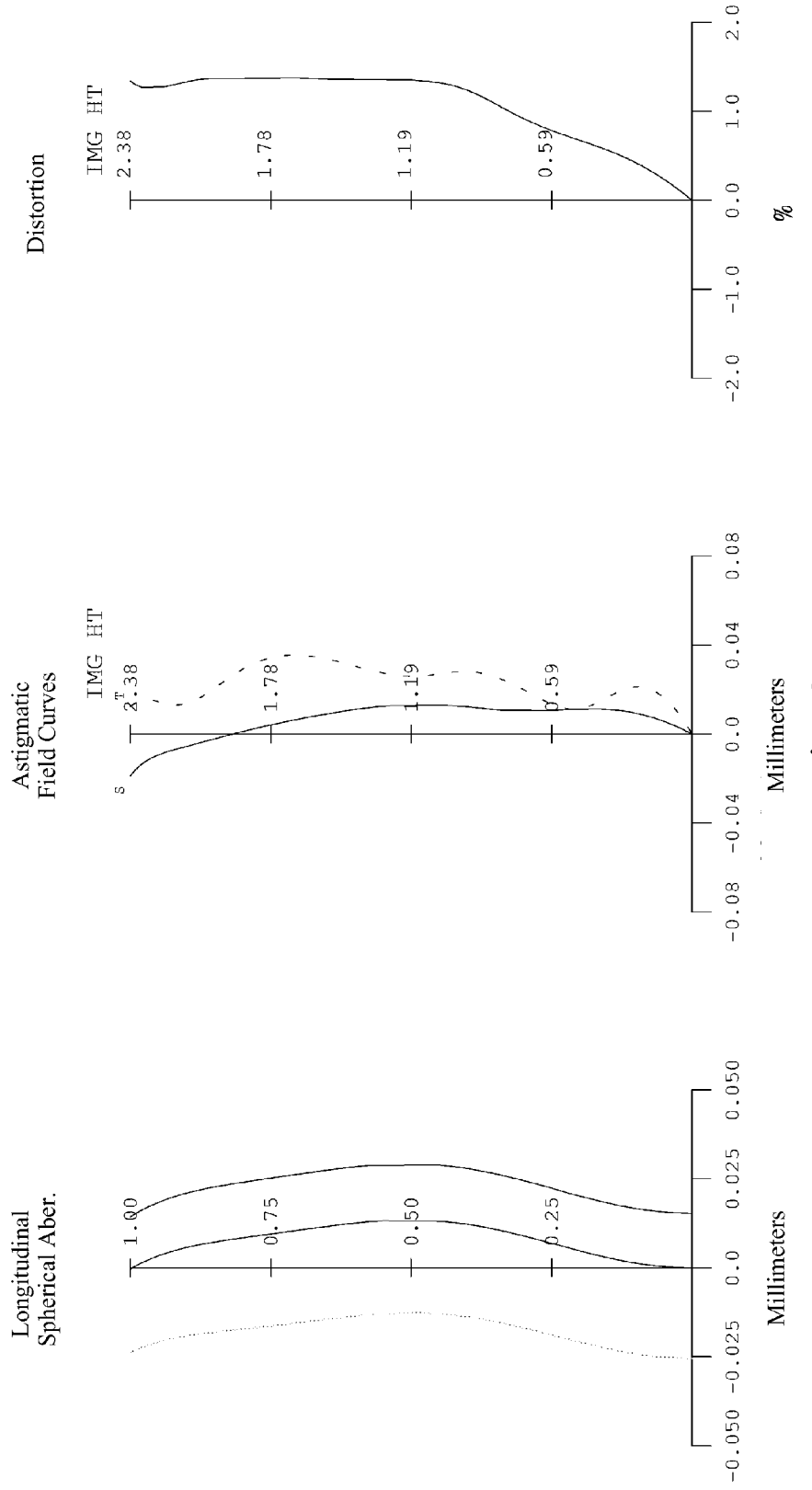
FIG. 6 shows various aberrations of the imaging lens apparatus of FIG. 5.

Referring to FIG. 6, as shown in FIG. 6, the spherical aberration, the astigmatic difference and the distortion aberration are all controlled in an excellent range. It is easy to see that the imaging lens apparatus in the present invention can not only eliminate the ghost and the flare, but also keep a good image quality.

Figure 7:
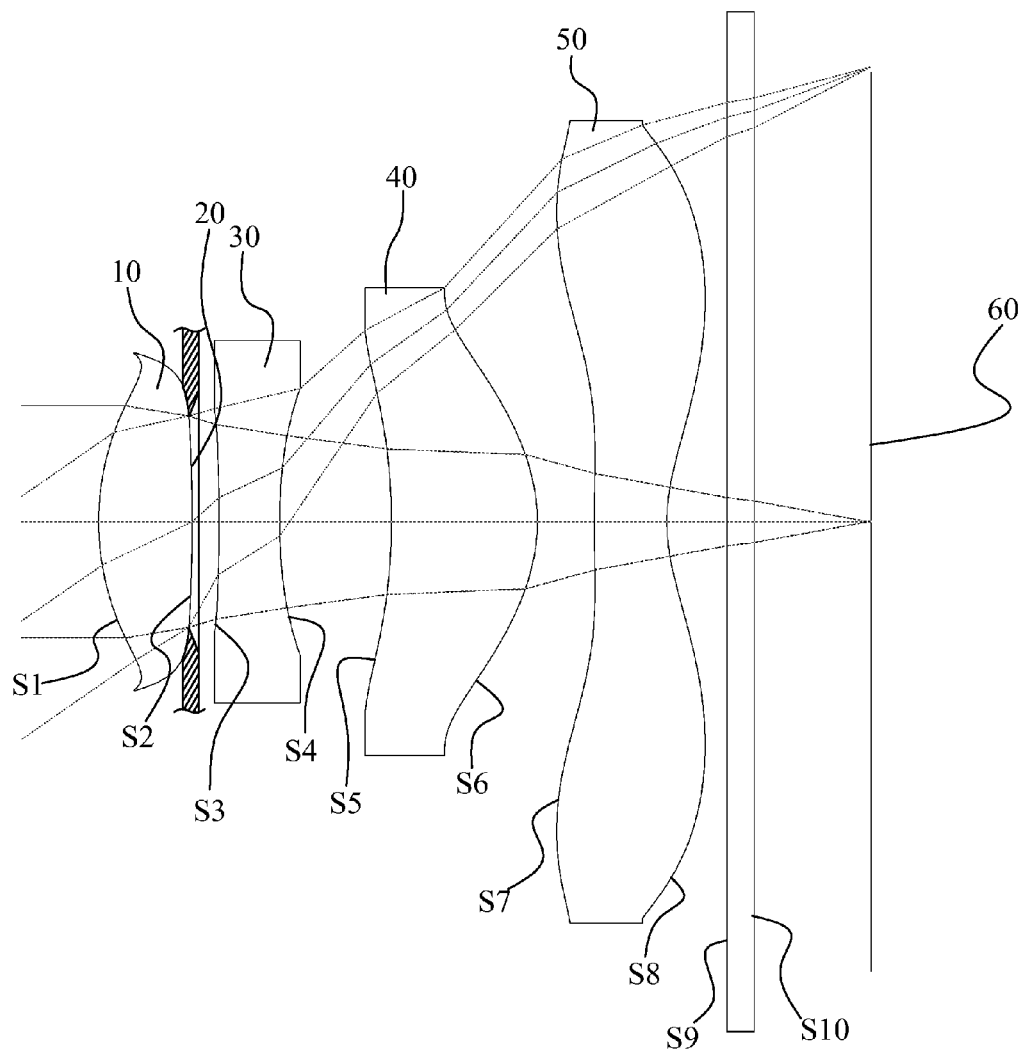
FIG. 7 shows a cross section of lenses in the imaging lens apparatus of the third embodiment of the present invention.

Referring to FIG. 7, FIG. 7 shows the third embodiment. In this embodiment, the F number is 2.8, angle of view is more than 69.4 degree, f/BFL is 3.16, $f_2/f$ is −1.03, $R_3/f$ is −1.76, and the radius of curvature, value of air space, refractivity and abbe number are listed below:

| surface # | Radius of curvature | Air space | Refractivity | Abbe number |
|---|---|---|---|---|
| S1 | 1.384 | 0.492 | 1.5311 | 55.7 |
| stop | −8.140 | 0.144 | | |
| S3 | −6.004 | 0.319 | 1.5850 | 30.0 |
| S4 | 3.213 | 0.589 | | |
| S5 | −2.931 | 0.769 | 1.5311 | 55.7 |
| S6 | −0.934 | 0.300 | | |
| S7 | 5.477 | 0.382 | 1.5311 | 55.7 |
| S8 | 0.910 | 0.317 | | |
| S9 | inf | 0.145 | 1.5170 | 664.1 |
| S10 | inf | 0.615 | | |

Furthermore, the aspheric surfaces of the first lens 10 to the fourth lens 50 satisfy the following aspheric equation:

$$z = \frac{ch^2}{1+\sqrt{(1-(1+k)c^2h^2)}} + A_4h^4 + A_6h^6 + A_8h^8 + A_{10}h^{10} + A_{12}h^{12} + A_{14}h^{14} + A_{16}h^{16}$$

Wherein, c is the curvature of the lens surface, h is the vertical distance between the surface of lens and the optical axis, k is the conic constant, and $A_4, A_6, A_8, A_{10}, A_{12}, A_{14}$ and $A_{16}$ are the aspheric constants of the higher order items. Said conic constant and aspheric constants are listed below:

| | S1 | S2 | S3 | S4 | S5 | S6 | S7 | S8 |
|---|---|---|---|---|---|---|---|---|
| K | 0.312856 | 0 | 0 | 8.734343 | 4.263026 | −0.63956 | −111.364 | −5.41417 |
| $A_4$ | −0.01255 | 0.091359 | 0.156419 | 0.201831 | −0.00923 | 0.209073 | −0.24895 | −0.16636 |
| $A_6$ | 0.150432 | −0.28843 | −0.61987 | −0.26991 | −0.13427 | −0.14212 | 0.177236 | 0.102327 |
| $A_8$ | −0.51675 | −0.13136 | −0.09684 | 0.002474 | 0.276807 | 0.00967 | −0.05623 | −0.04376 |
| $A_{10}$ | 0.763076 | −0.28341 | 0.227149 | 0.32021 | −0.12175 | 0.075742 | 0.008802 | 0.01178 |
| $A_{12}$ | 0.013784 | −1.11321 | −1.81958 | −0.51692 | 0.050456 | −0.01794 | −0.00054 | −0.00178 |
| $A_{14}$ | −1.04135 | −1.16573 | −1.67461 | 0.517275 | 0 | −0.00098 | 0 | 0.000115 |
| $A_{16}$ | −0.02625 | −1.55E−05 | −1.24E−05 | 0 | 0 | 0 | 0 | 0 |

With the settings in the third embodiment, the ratio of the sag and the vertical distance between surface and optical axis at the periphery of the image-side surface of the third lens 40 (SAG_S6/SD_S6) falls in the range from −0.7 to −0.3, the absolute value of reciprocal of the slope at the periphery of the image-side surface of the third lens 40 (|1/slope_S6|) falls in the range from 0.7 to 0.87; the ratio of the sag and the vertical distance between surface and optical axis at the periphery of the image-side surface of the fourth lens 50 (SAG_S8/SD_S8) falls in the range from 0.038 to 0.085, the absolute value of reciprocal of the slope at the periphery of the image-side surface of the fourth lens 50 (|1/slope_S8|) falls in the range from 3.0 to 4.7.

Figure 8:
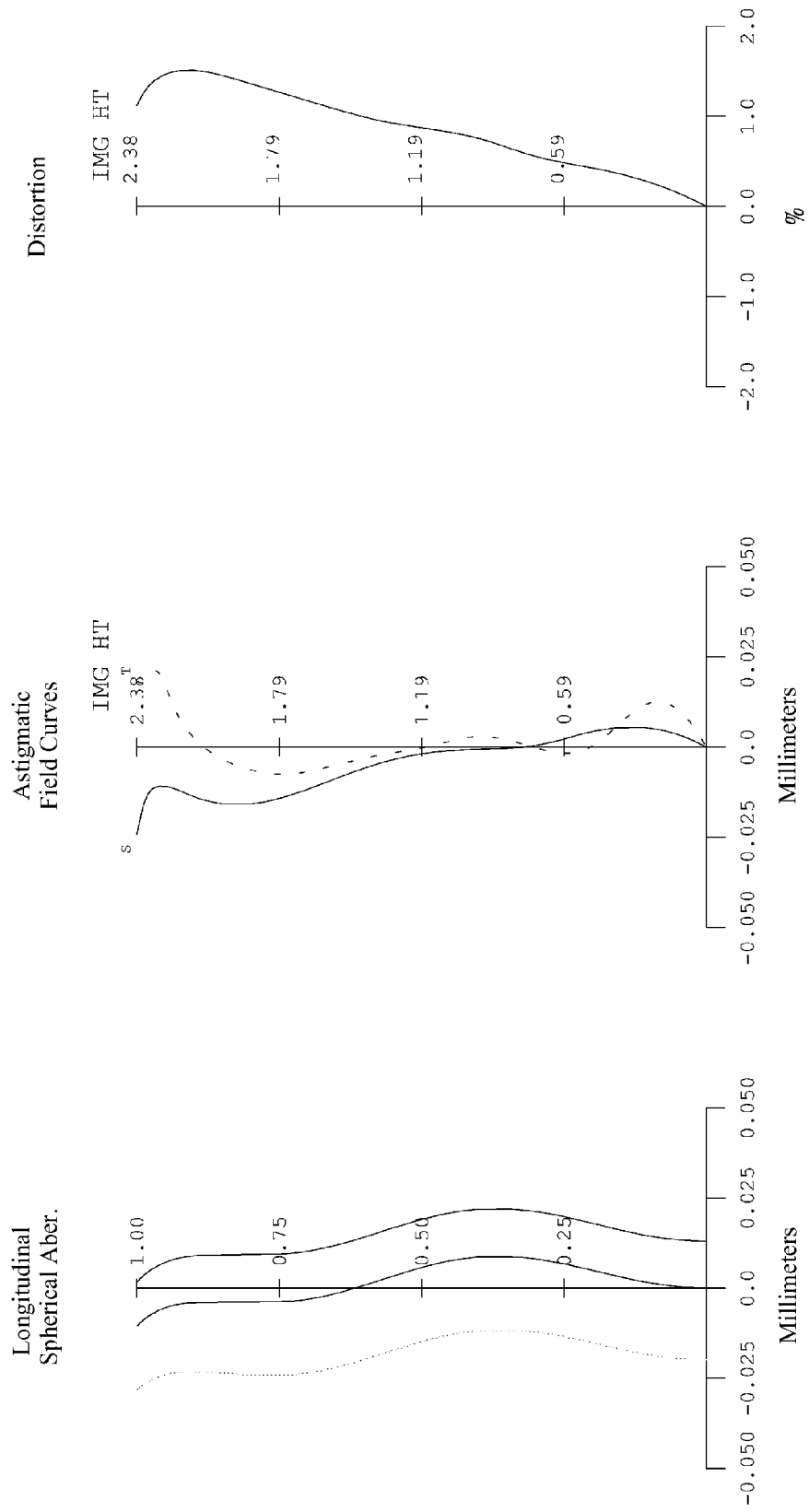
FIG. 8 shows various aberrations of the imaging lens apparatus of FIG. 7.

Referring to FIG. 8, as shown in FIG. 8, the spherical aberration, the astigmatic difference and the distortion aberration are all controlled in an excellent range. It is easy to see that the imaging lens apparatus in the present invention can not only eliminate the and the flare, but also keep a good image quality.

Figure 9:
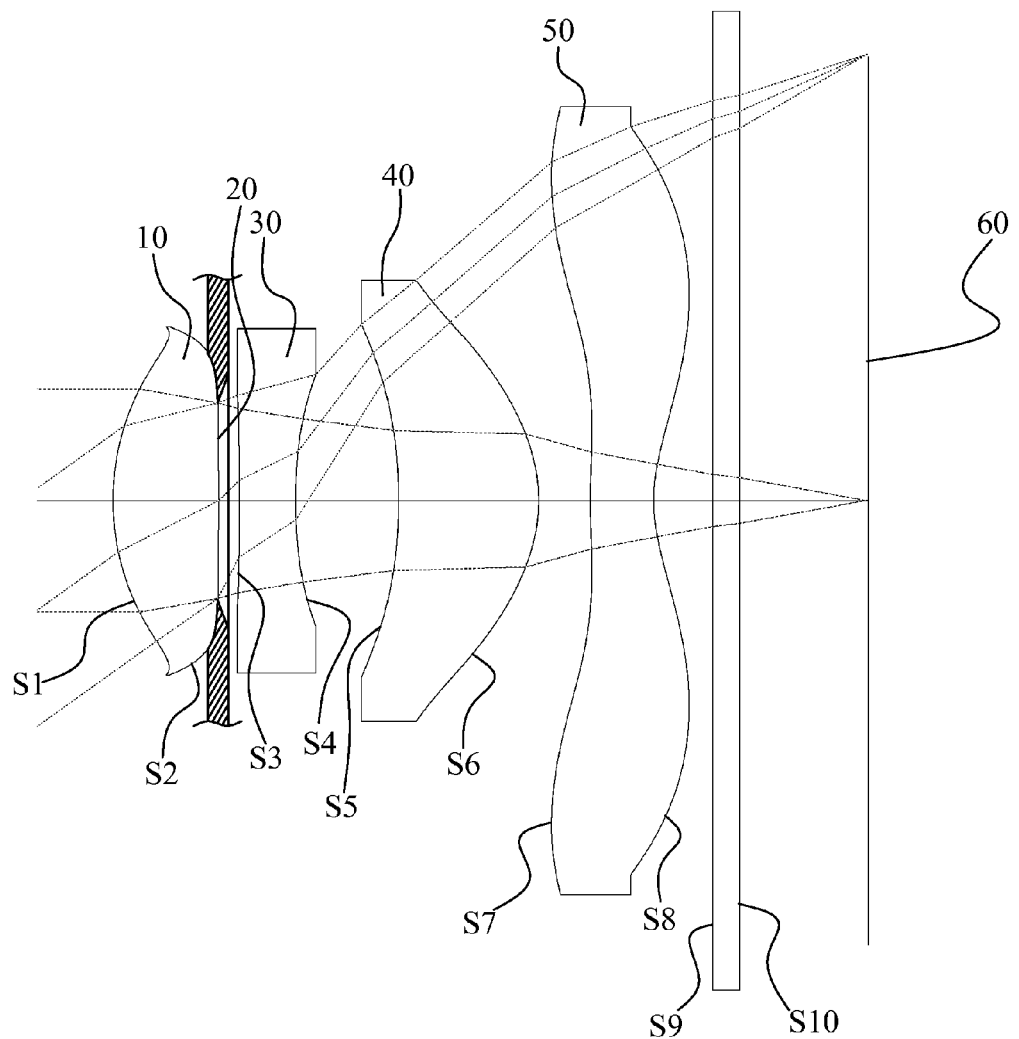
FIG. 9 shows a cross section of lenses in the imaging lens apparatus of the fourth embodiment of the present invention.

Referring to FIG. 9, FIG. 9 shows the fourth embodiment. In this embodiment, the F number is 2.8, angle of view is more than 70.8 degree, f/BFL is 2.89, $f_2/f$ is −1.09, $R_3/f$ is −2.75, and the radius of curvature, value of air space, refractivity and abbe number are listed below:

| surface # | Radius of curvature | Air space | Refractivity | Abbe number |
|---|---|---|---|---|
| S1 | 1.329 | 0.566 | 1.5311 | 55.7 |
| stop | −16.521 | 0.113 | | |
| S3 | −9.158 | 0.300 | 1.5850 | 30.0 |
| S4 | 2.836 | 0.554 | | |
| S5 | −2.517 | 0.750 | 1.5311 | 55.7 |
| S6 | −0.866 | 0.277 | | |
| S7 | 3.952 | 0.340 | 1.5311 | 55.7 |
| S8 | 0.872 | 0.317 | | |
| S9 | inf | 0.145 | 1.5170 | 64.1 |
| S10 | inf | 0.688 | | |

Furthermore, the aspheric surfaces of the first lens to the fourth lens satisfy the following aspheric equation:

$$z = \frac{ch^2}{1+\sqrt{(1-(1+k)c^2h^2)}} + A_4h^4 + A_6h^6 + A_8h^8 + A_{10}h^{10} + A_{12}h^{12} + A_{14}h^{14} + A_{16}h^{16}$$

Wherein, c is the curvature of the lens surface, h is the vertical distance between the surface of lens and the optical axis, k is the conic constant, and $A_4, A_6, A_8, A_{10}, A_{12}, A_{14}$ and $A_{16}$ are the aspheric constants of the higher order items. Said conic constant and aspheric constants are listed below:

| | S1 | S2 | S3 | S4 | S5 | S6 | S7 | S8 |
|---|---|---|---|---|---|---|---|---|
| K | 0.260046 | 0 | 0 | 6.524985 | 4.305224 | −0.6212 | −331.682 | −6.87632 |
| $A_4$ | −0.0193 | 0.134443 | 0.226204 | 0.205316 | 0.026518 | 0.21439 | −0.25548 | −0.17053 |
| $A_6$ | 0.151971 | −0.2541 | −0.58645 | −0.31633 | −0.12046 | −0.13247 | 0.17809 | 0.100672 |
| $A_8$ | −0.52753 | −0.07728 | −0.0889 | 0.024172 | 0.245399 | 0.021825 | −0.05603 | −0.04377 |
| $A_{10}$ | 0.746714 | 0.217801 | 0.988986 | 0.469888 | −0.14519 | 0.080952 | 0.008813 | 0.011802 |
| $A_{12}$ | 0.006602 | −0.95699 | −1.76169 | −0.42882 | 0.049967 | −0.01804 | −0.00055 | −0.00178 |
| $A_{14}$ | −0.95691 | 0.444029 | 0.396315 | 0.076712 | 0 | −0.005 | 0 | 0.000115 |
| $A_{16}$ | 0.246495 | −1.78E−05 | −1.46E−05 | 0 | 0 | 0 | 0 | 0 |

With the settings in the fourth embodiment, the ratio of the sag and the vertical distance between surface and optical axis at the periphery of the image-side surface of the third lens 40 (SAG_S6/SD_S6) falls in the range from −0.56 to −0.31, the absolute value of reciprocal of the slope at the periphery of the image-side surface of the third lens 40 (|1/slope_S6|) falls in the range from 1.4 to 1.1; the ratio of the sag and the vertical distance between surface and optical axis at the periphery of the image-side surface of the fourth lens 50 (SAG_S8/SD_S8) falls in the range from −0.062 to 0.04, the absolute value of reciprocal of the slope at the periphery of the image-side surface of the fourth lens 50 (|1/slope_S8|) falls in the range from 1.4 to 2.7.

Figure 10:
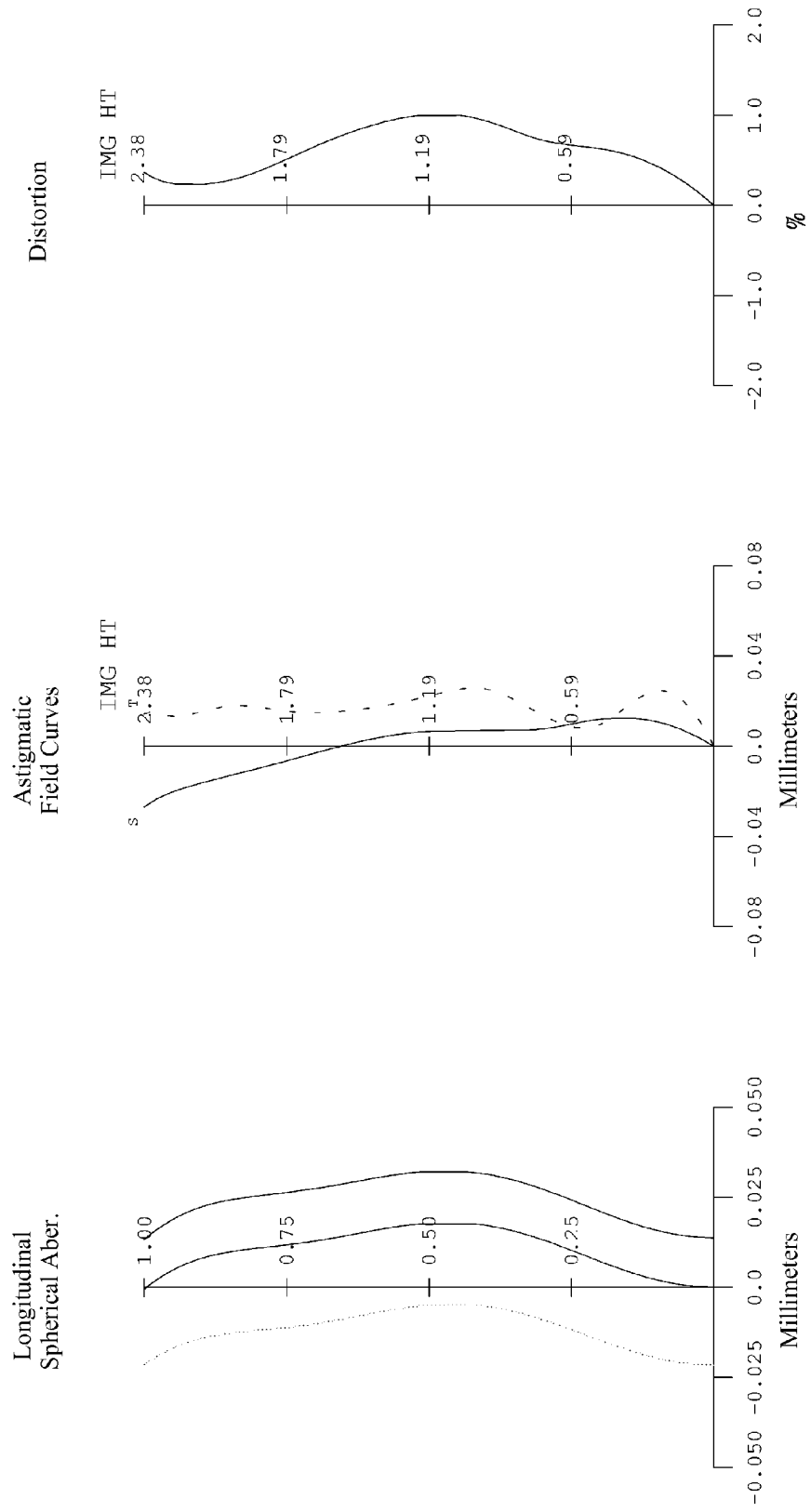
FIG. 10 shows various aberrations of the imaging lens apparatus of FIG. 9.

Referring to FIG. 10, as shown in FIG. 10, the spherical aberration, the astigmatic difference and the distortion aberration are all controlled in an excellent range. It is easy to see that the imaging lens apparatus in the present invention can not only eliminate the ghost and the flare, but also keep a good image quality.

As described above, the imaging lens apparatus in this invention can limit the angle of incidence ray and irradiance of reflected light, and reduce the ghost and flare formed at the imaging area by adjusting slope and sag of the periphery of the image-side surface of the fourth lens 50. Ensure the small size lenses to keep the distortion aberration under 2%, angle of view more than 70 degree, correct the spherical aberration, chromatic aberration, astigmatic difference and the ghost, improve the image quality and reduce the produce cost.

What is claimed is:

1. An imaging lens apparatus, comprising:
   a first lens with a convex object-side surface and positive refractive power, at least one surface of the first lens is aspheric;
   a second lens which is a biconcave lens with negative refractive power, at least one surface of the second lens is aspheric;
   an aperture stop located between the first lens and the second lens, for controlling the ray cone that come to focus at the image plane;
   a third lens which is a positive meniscus lens with a concave object-side surface, both side of the third lens are aspheric; and
   a fourth lens which is a negative meniscus lens with a convex object-side surface, both side of the fourth lens are aspheric with at least one inflection point; and
   wherein the imaging lens apparatus satisfies the conditions below:

$|1/slope\_S8|>0.9$ $-0.2<SAG\_S8/SD\_S8<0.1$ wherein slope_S8 is the slope of the periphery of the image-side surface of the fourth lens in the imaging lens apparatus; SD_S8 is the vertical distance between the periphery of the image-side surface of the fourth lens and the optical axis; and SAG_S8 is the sag of the image-side surface of the fourth lens related to SD_S8.

2. The imaging lens apparatus as claimed in claim 1, wherein the imaging lens apparatus further satisfies the following conditions:

$1.5<f/FBL<5$ wherein f is the combined focal length of the imaging lens apparatus; BFL is the distance between the image-side surface of the fourth lens and the imaging plane.

3. The imaging lens apparatus as claimed in claim 1, wherein the imaging lens apparatus further satisfies the following conditions:

$-2.5<f_2/f<-0.7$ wherein $f_2$ is the focal length of the second lens; and f is the combined focal length of the imaging lens apparatus.

4. The imaging lens apparatus as claimed in claim 1, wherein the imaging lens apparatus further satisfies the following conditions:

$R_3/f<0$ wherein $R_3$ is the radius of curvature of the object-side surface of the second lens; f is the combined focal length of the imaging lens apparatus.

5. The imaging lens apparatus as claimed in claim 1, wherein the imaging lens apparatus further satisfies the following conditions:

$V_2<32$ wherein $V_2$ is the abbe number of the second lens.

6. The imaging lens apparatus as claimed in claim 1, wherein the imaging lens apparatus further satisfies the following conditions:

$-0.8<SAG\_S6/SD\_s6<-0.2$ wherein SD_S6 is the vertical distance between the periphery of the image-side surface of the third lens and the optical axis; and SAG_S6 is the sag of the image-side surface of the third lens related to SD_S6.

7. The imaging lens apparatus as claimed in claim 1, wherein the imaging lens apparatus further satisfies the following conditions:

$|1/slope\_S6|>0.5$ wherein slope_S6 is the slope of the periphery of the image-side surface of the third lens in the imaging lens apparatus.

* * * * *